(12) United States Patent
Pyron (10) Patent No.: US 7,893,363 B2
(45) Date of Patent: Feb. 22, 2011

(54) LARGE CAPACITY UNIVERSAL CONDUIT BODIES

(75) Inventor: Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 289 days.

(21) Appl. No.: 12/265,075

(22) Filed: Nov. 5, 2008

(65) Prior Publication Data

US 2009/0126988 A1    May 21, 2009

Related U.S. Application Data

(60) Provisional application No. 61/003,270, filed on Nov. 15, 2007.

(51) Int. Cl.
*H02G 3/04* (2006.01)

(52) U.S. Cl. .................. 174/481; 174/480; 174/68.1; 174/68.3; 174/96; 174/24; 439/207; 248/300

(58) Field of Classification Search .................. 174/480, 174/481, 19, 24, 68.1, 68.3, 96; 248/300, 248/906; 439/207, 582, 535; 220/3.8; 52/220.1; 24/546

See application file for complete search history.

(56) References Cited

U.S. PATENT DOCUMENTS

| | | | |
|---|---|---|---|
| 1,777,504 A | 10/1930 | Selah | |
| 3,020,332 A | 2/1962 | Appleton | |
| 3,029,965 A | 4/1962 | Maier | |
| 3,038,702 A | 6/1962 | Trunnell | |
| 3,052,450 A | 9/1962 | Trunnell | |
| 3,430,799 A | 3/1969 | Maier | |
| 4,508,371 A | 4/1985 | Maier | |
| 4,801,118 A | 1/1989 | Wium | |
| 4,936,478 A | 6/1990 | Bozdeck | |
| 5,161,580 A | 11/1992 | Klug | |
| 5,234,018 A | 8/1993 | Grachal et al. | |
| 6,049,040 A | 4/2000 | Biles et al. | |
| 6,069,317 A | 5/2000 | Wagganer | |
| 6,580,029 B1 | 6/2003 | Bing | |
| 6,885,805 B2 | 4/2005 | Asada | |
| 6,916,014 B1 * | 7/2005 | Thomas | 254/134.3 R |

(Continued)

OTHER PUBLICATIONS

Page from T&B on-line catalog, product No. TL 201; http://www-public.tnb.com/ps/fultilt/index.cgi?check=Y&part+tl201.

(Continued)

*Primary Examiner*—Dhiru R Patel
(74) *Attorney, Agent, or Firm*—Hoffmann & Baron, LLP (57) ABSTRACT

A conduit body device for accommodating wire therethrough the device is provided. The conduit body has a body wall including a pair of elongate side walls and a pair of end walls forming a perimetrical side wall, a bottom wall, and an open end defining a body interior. The conduit body further includes a longitudinal axis located generally along the elongate side walls. At least two hub passageways extend from the conduit body in communication with the body interior, each of the hub passageways including a hub wall defining an access channel for passage of wires therethrough. The hub passageways may be generally located in non-axial alignment with said longitudinal axis. In some embodiments the bottom wall has a broad curved shape. In other embodiments, the open end may be angled for ease of access.

15 Claims, 10 Drawing Sheets

U.S. PATENT DOCUMENTS

| | | |
|---|---|---|
| 7,057,104 B1 | 6/2006 | McCleskey |
| 7,427,714 B1 * | 9/2008 | Lammens et al. ............. 174/66 |
| 7,484,711 B2 | 2/2009 | Pyron |
| 7,504,580 B2 * | 3/2009 | Lammens et al. ............. 174/50 |
| 7,582,855 B2 | 9/2009 | Pfeiffer |

OTHER PUBLICATIONS

Page from T&B on-line catalog, product No. HL 601; http://www-public.tnb.com/ps/fultilt/index.cgi?check=Y&part+hl601.

* cited by examiner

LARGE CAPACITY UNIVERSAL CONDUIT BODIES

CROSS-REFERENCE TO RELATED APPLICATIONS

The present invention claims priority to U.S. Provisional Application Ser. No. 61/003,270, filed Nov. 15, 2007, the entire contents of which are incorporated by reference.

FIELD OF THE INVENTION

The present invention relates generally to a conduit body containing electrical wires, and more particularly, relates to a conduit body which facilitates the passage of wires and cables therethrough.

BACKGROUND OF THE INVENTION

Electrical conduit systems are required in order to safely provide electrical power to industry, homes, commercial buildings and the like. These conduit systems often include long runs of rigid electrical conduit with frequent changes in direction, such as 90° turns. Conduit bodies are typically installed in the conduit systems at various locations, both to provide access to the wires and to route the wires along the conduit path. Often, the change of direction in the conduit is accomplished in the conduit body.

Conventional conduit bodies are generally elongate having longitudinal side walls defining an open ended chamber. A removable cover may be provided for closing the open end of the body. The conduit body may include hubs at locations along the body for attachment of the conduit and passage of the wire therethrough. Traditionally, the arrangements include at least one hub passageway which is in axial alignment with the chamber body, and at least one hub passageway which is at approximately a 90° angle to the axis of the chamber. Existing conduit bodies are very parametric in geometry, and require very specific arrangements to fit various applications. Existing conduits are quite difficult for the user to feed cables and wires through. In particular, having a hub located at the end of the chamber body is fairly difficult or inconvenient for the user to feed wire through. Conduit bodies may come in various shapes and styles, depending upon the angle and attachment required, such as an LL configuration, LR configuration, LB configuration, and others. Traditionally, a separate conduit device would be required for each specific configuration desired.

In addition to requiring a different device for each particular configuration, traditional conduits require a sharp 90° turn in the wires being routed therethrough. In order to effect such a turn in a conduit body, the wire contained therein must be bent or curved. In certain situations, especially with the use of communications cables such as data cable and fiber optic cable, placing a small bend radius on the cable to effect the change in direction may adversely affect the performance of the cable. In addition, existing conduit devices are limited in space, not being suited for a large volume of wires to pass through.

The art has seen various devices used in combination with conduit bodies to help support the wire as it is passed through the conduit body especially where changes in direction are required. For example, U.S. Pat. Nos. 4,801,118 and 6,838,615 employ inserts placed in the conduit body to help facilitate movement of the wire therethrough.

Another example which specifically attempts to provide a minimum bend radius in a conduit body is U.S. Pat. No. 5,580,029. In the '029 patent, the conduit body is modified to provide an inwardly projecting curved bump in the bottom wall thereof. This bump forces the wire pulled therethrough to achieve a desirable bend radius upon making a change of direction therein. While this device may serve adequately to effect a desirable change in direction, the inwardly extending projection does provide an obstruction to the pulling of the wire through the conduit body and also reduces the usable interior capacity of the conduit body. Further, the '029 patent uses axial and perpendicular hubs, which create difficulty to access and feed wires when the conduits are attached in certain arrangements.

Another example of an attempt to provide a minimum bend radius in a conduit body may be seen in U.S. Pat. No. 7,057,104. In the '104 patent, the conduit body is modified to have a large radius on one of the walls. While this device may allow for a more desirable bend radius upon making a change in direction, the locations of the hubs are still located in an undesirable position, i.e., at least one hub is always located in an axial alignment with the longitudinal axis of the chamber of the conduit. As described above, having an axially-aligned hub passageway severely limits the access to the hub passageways and restricts the user's ability to feed and pull wiring in certain situations.

It is, therefore, desirable to provide a conduit body which effects a change in direction of wires pulled therethrough so as to maintain a desirable bend radius and which overcomes the deficiencies of the prior art, and which allows for more convenient access for feeding and pulling of the wires therein.

SUMMARY OF THE INVENTION

A conduit body device accommodates wires therethrough. The device includes a conduit body having a body wall including a pair of opposed elongate side walls and opposed end walls, a bottom wall, and an open end defining a body interior. The body includes at least two hub passageways extending from the body wall in communication with the body interior, the hubs being in a non-axial alignment with the body interior. Each hub passageway includes a hub wall defining an access channel for passage of the wire therethrough. The bottom wall of the conduit body has a large curving shape, extending between the two hubs. In a preferred embodiment, the hub walls are generally annular and are preferably perpendicular with respect to each other.

In the preferred embodiment, the open end is angled with respect to the elongate side walls.

BRIEF DESCRIPTION OF THE PREFERRED EMBODIMENT

The present invention provides a conduit body for use in electrical systems, including electrical conduit systems, where electrical wire and cables are run through various structures. The conduit body which is used in conduit systems allows the wires to be pulled through the conduit system and also affects changes of direction in the system.

Figure 1:
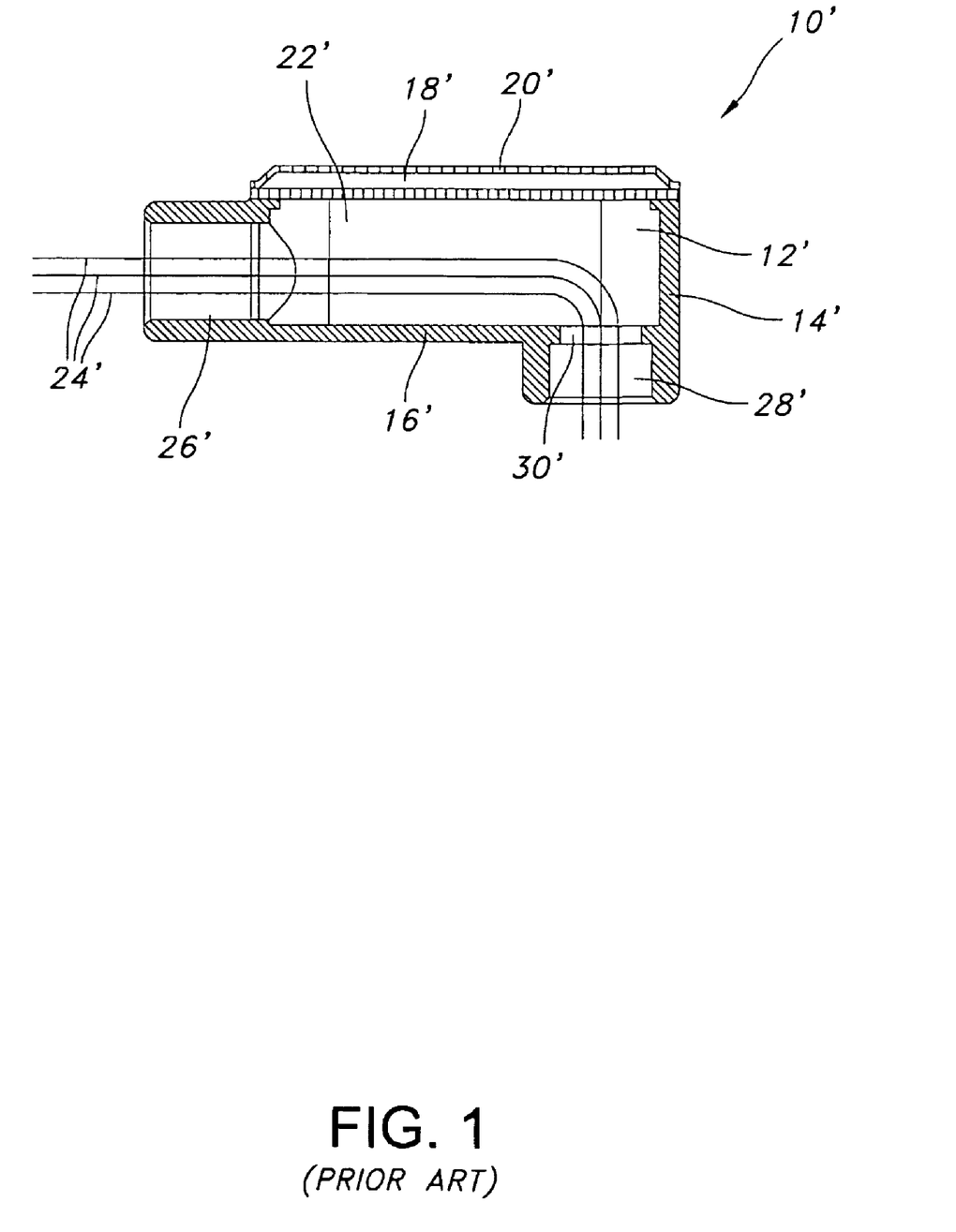
FIG. 1 shows a conventional conduit body of the prior art showing a change of direction in a wire passing therethrough.

FIG. 1 shows a conventional conduit body 10' currently used in conduit systems. Conduit body 10' is generally an elongate tubular shaped member, which is generally formed of a material which matches the conduit employed in the system. A typical conduit body is formed, for example, of metal or plastic material.

A conduit body 10' includes a conduit body wall 12' including an upwardly extending perimetrical side wall 14', which extends around an interior chamber 22', a closed bottom wall 16' and an opposed open end 18'. The open upper end 18' may be closed with a removable cover 20' which allows access to the interior chamber 22' of conduit body 10'.

In order to provide passage of wire 24' through the conduit body 10', the conduit body 10' may include a plurality of hubs 26' and 28'. In the present illustrated embodiment, two hubs are shown. Lateral hub 26' extends from side wall 14' and depending hub 28' extends from bottom wall 16'. Each hub includes an access port including a central channel therethrough for allowing passage of wire 24' through the conduit body 10'.

As can be seen in FIG. 1, a 90° change in direction of wire 24' may be accomplished in conduit body 10' by virtue of the orientation of hubs 26' and 28'. Each change in direction is achieved by placing a sharp 90° bend in wire 24' at bend location 30'. As may be appreciated especially with certain types of wires and cables, such as data cable and fiber optic cable, a sharp bond of this type may adversely affect the performance of the wire. Moreover, requiring such a sharp bend makes it more difficult to pull wire 24' through the conduit body 10'. Further, in traditional devices such as that shown in FIG. 1, the open end 18' is located at a 90° angle with respect to the side wall 14'. When such device is mounted against the side of a wall, this open end is difficult to access, making it quite arduous to feed and pull wires through the conduit.

Referring now to FIGS. 2 through 11, an improved universal conduit body is shown. Conduit body 10 may be formed of any material, most desirably a metal such as iron, aluminum, steel or other suitable metals.

Conduit body 10 includes a conduit body wall 12, including a perimetrical side wall 14, a bottom wall 16 and an opposed open end 18. Perimetrical side wall 14 preferably includes opposed elongate walls 14a and 14b and opposed end walls 14c and 14d. The conduit body 10 may include a removable cover 20 which is designed to fit over the open end 18. The cover 20 may be made of the same or different material as the conduit body 10. The side wall 14, bottom wall 16 and open end 18 form a conduit body chamber 22. The conduit body chamber 22 has a longitudinal axis 40, which is generally located along the elongate side walls 14a and 14b of perimetrical side wall 14.

Figure 2:
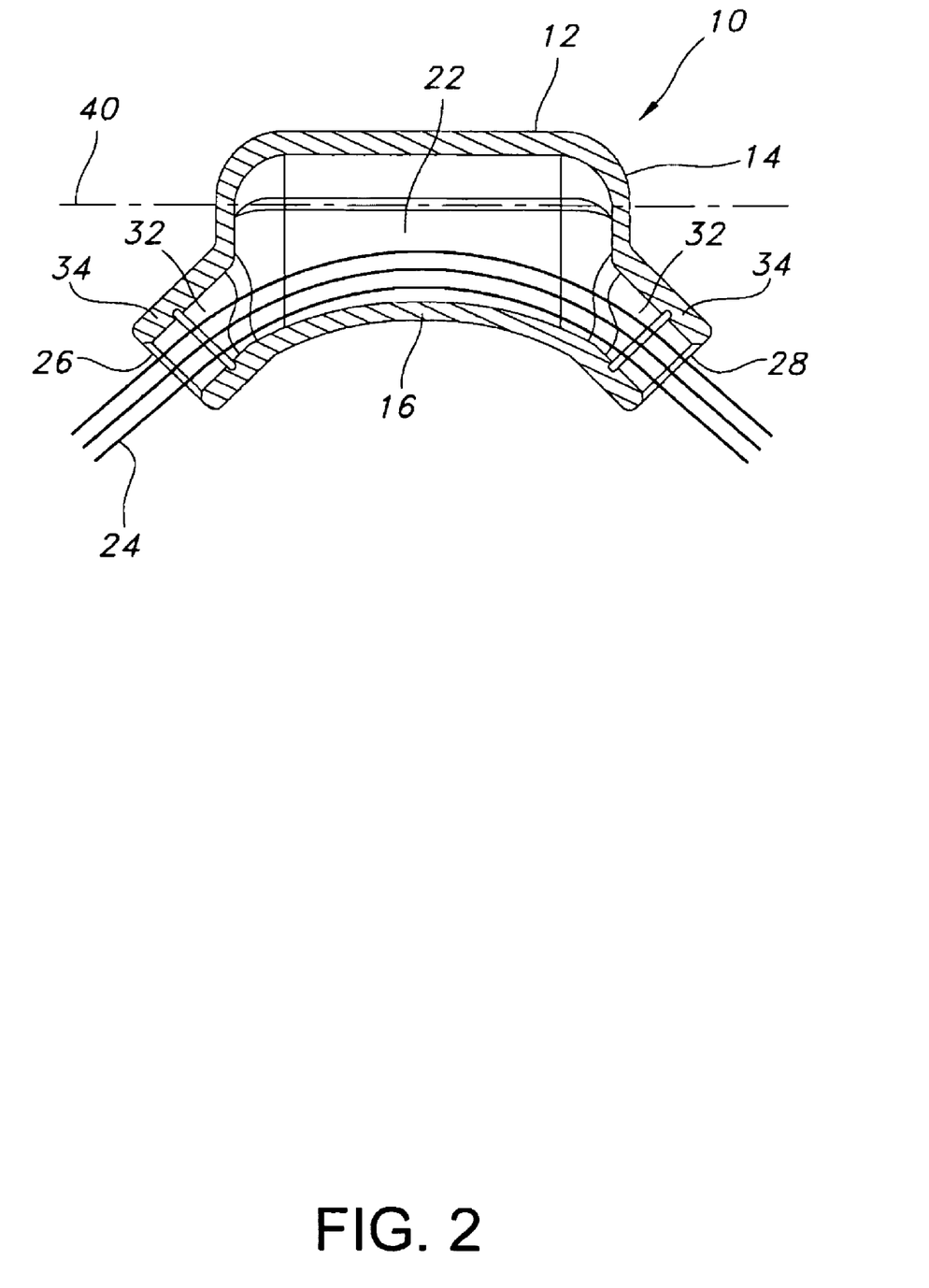
FIG. 2 shows the conduit body of the present invention showing a change in direction in a wire passing therethrough.

Conduit body 10 may include one more hub passageways 26 and 28, which are in communication with the conduit body chamber 22 and provide access to the interior of the chamber 22. Each of the hub passageways 26 and 28 extending from the conduit body 10 is generally a hollow cylindrical member, which defines an access channel 32 in communication with the interior of the chamber 22. The access channel 32 is defined by generally cylindrical hub wall 34, a distal portion of which may be threaded to accommodate a threaded attachment of a conduit (not shown) thereto. The distal portion may include any attachment means desired, including threads, clips or other means for attachment of a conduit.

In one embodiment, the conduit body 10 includes two hub passageways 26 and 28. The hub passageways 26 and 28 may be located at any angle to the longitudinal axis 40. Preferably, the hub passageways 26 and 28 are located at a non-axial and non-perpendicular angle to the longitudinal axis 40, and most preferably are located at approximately a 30° to 60° angle to the longitudinal axis 40. Additionally, the hub passageways 26 and 28 may be located at any angle with respect to each other, and preferably are at approximately a perpendicular angle with respect to each other. As shown in FIG. 2, the hub passageways 26 and 28 are located at a 90° angle to each other.

As can be seen in FIG. 2, the hub passageways 26 and 28 provide access for wires or cables 24 to pass through the conduit body 10 without experiencing a sharp bend such as is generally found in existing conduit body devices.

As can be seen in FIG. 2, the bottom wall 16 has a broad uniformly curved shape. The curve of the bottom wall 16 preferably extends the entire length of bottom wall 16. In the preferred embodiment, the bottom wall 16 extends from one of the hub passageways to the other. The curved shape of bottom wall 16 allows for a greater bend radius to wires 24, which extend from the hub passageways 26 through the chamber 22 and through another hub passageway 28. In addition, the broad curved wall 16 allows for a larger interior chamber 22, which gives more space so that a larger volume of wires and cables 24 can be fed through the conduit body 10.

In embodiments incorporating more than two hub passageways, there may be several walls that each have a broad curved shape, preferably located between each of the hub passageways. In such embodiments, wires 24 may extend through only two of the hub passageways, or wires 24 may split or be spliced, traveling through more than two hub passageways.

The open end 18 of the conduit body 10 aids in feeding the wires 24 through the conduit body 10. By having an open end 18 in the conduit body 10, wires 24 may be more easily pulled through one of the hub passageways 26 and fed through another. Preferably, the open end 18 is located at a location opposite the bottom wall 16 or the hub passageways 26 and 28. As will be explained in more detail below, the open end 18 is preferably angled with respect to the chamber 22. In embodiments incorporating more than two hub passageways, the wires 24 may be split or spliced and fed through more than two hub passageways, where the user may access wires 24 through the open end 18 to aid in splitting or splicing the wires 24.

Figure 3:
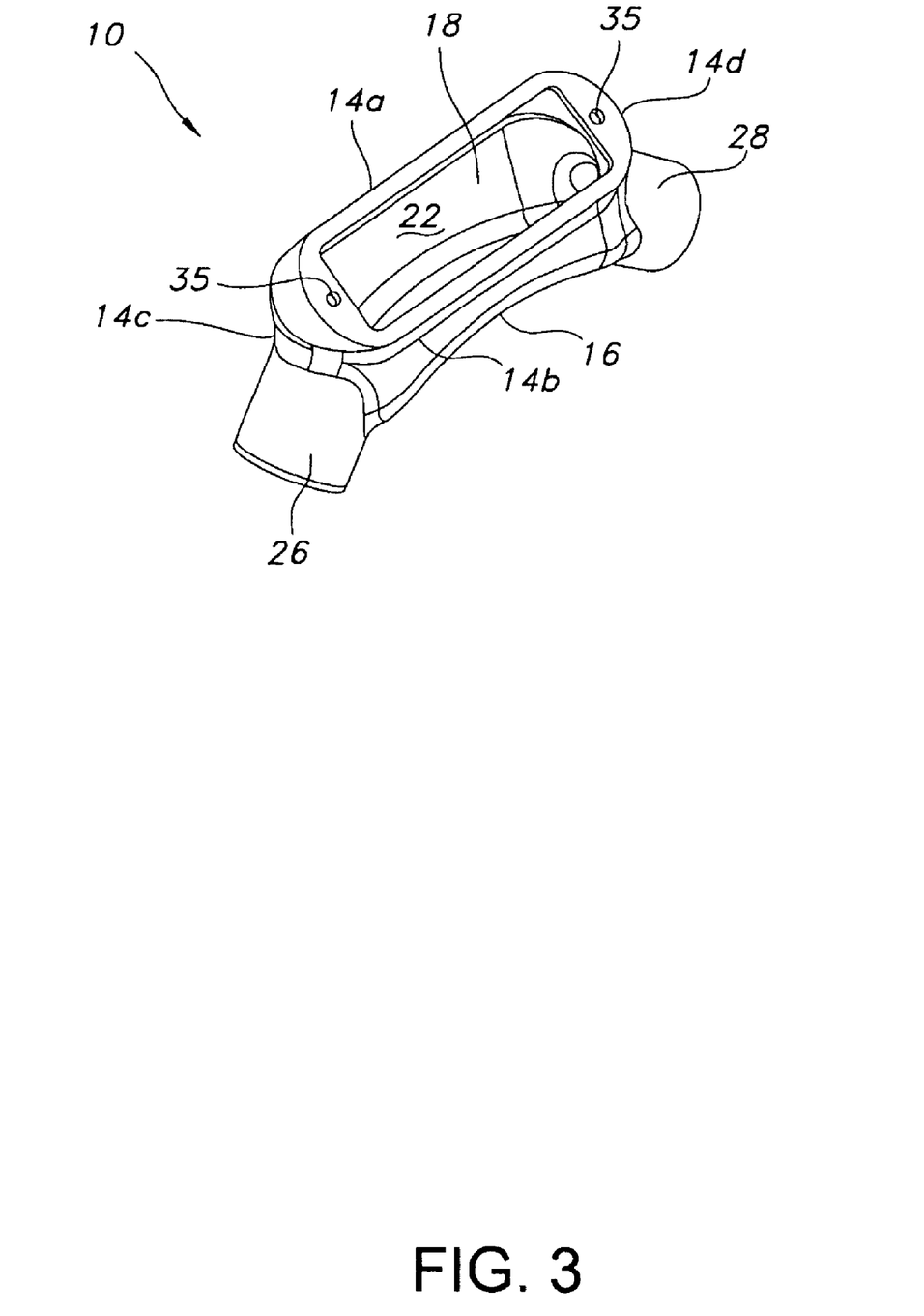
FIG. 3 is a front perspective showing of the conduit body of the present invention.

FIG. 3 shows a top view of the conduit body 10 of the present invention, providing a view through the open end 18 into chamber 22. As can be seen, the open end 18 of the conduit body 10 allows access to the inside chamber 22 of the body, allowing the user to pull and feed wires 24 through the conduit body 10. In one embodiment, the open end 18 may be closed by a removable cover 20 (FIG. 8), which is generally shaped and sized to fit over the open end 18. The removable cover may be secured to the open end 18 by any fastening means desired. For example, apertures 35 on the conduit body wall 12 may accommodate a screw or other fastener to secure the cover over the open end 18.

Figure 4:
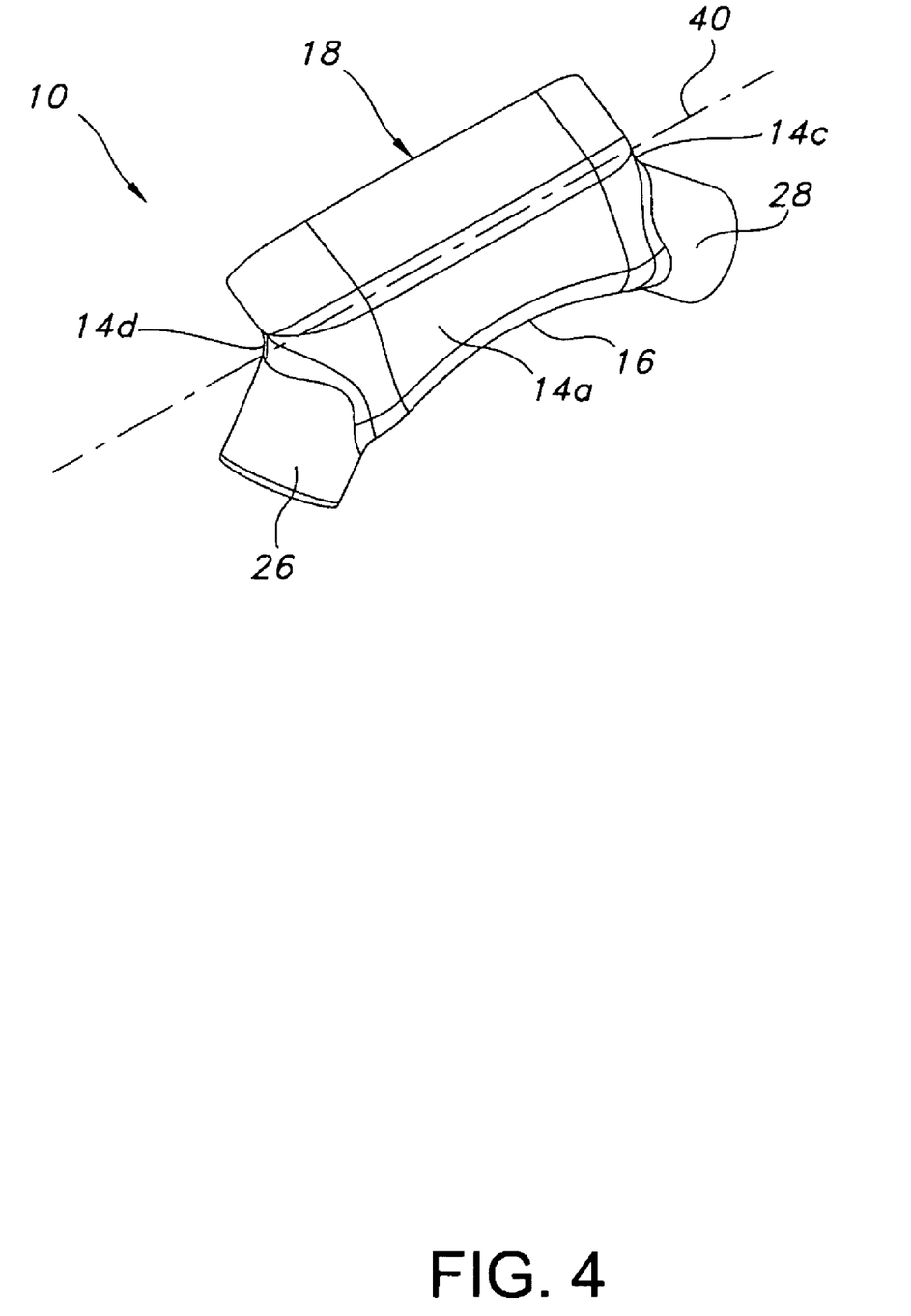
FIG. 4 is a rear perspective showing of the conduit body of the present invention.

The open end 18 may be located at any desired angle to the elongate side wall 14. In traditional conduit devices, the open end is located at approximately a 90° angle to the side wall. As shown in FIG. 4, however, the open end 18 of the present invention may be heightened or raised to a degree, which allows the open end 18 to be angled with respect to the perimetrical side wall 14, as opposed to being positioned directly over the chamber 22 of the conduit body 10. Alternatively, the open end 18 may be raised from the chamber 22 by a shroud or hood extension to create the angle of the open end 18. The angled open end 18 allows for access to the chamber 22 when the device is mounted in various locations and non-perpendicular angles. In addition, the angled opening helps in packaging multiple conduits, as multiple devices fit more compactly together. The hood extension 36 may be made of the same material as the conduit body 10, or it may be of a different material. Further, the hood extension 36 may be removable, or it may be made of a collapsible plastic material, such that the extension 36 may be extended or collapsed to form different angles.

Figure 5:
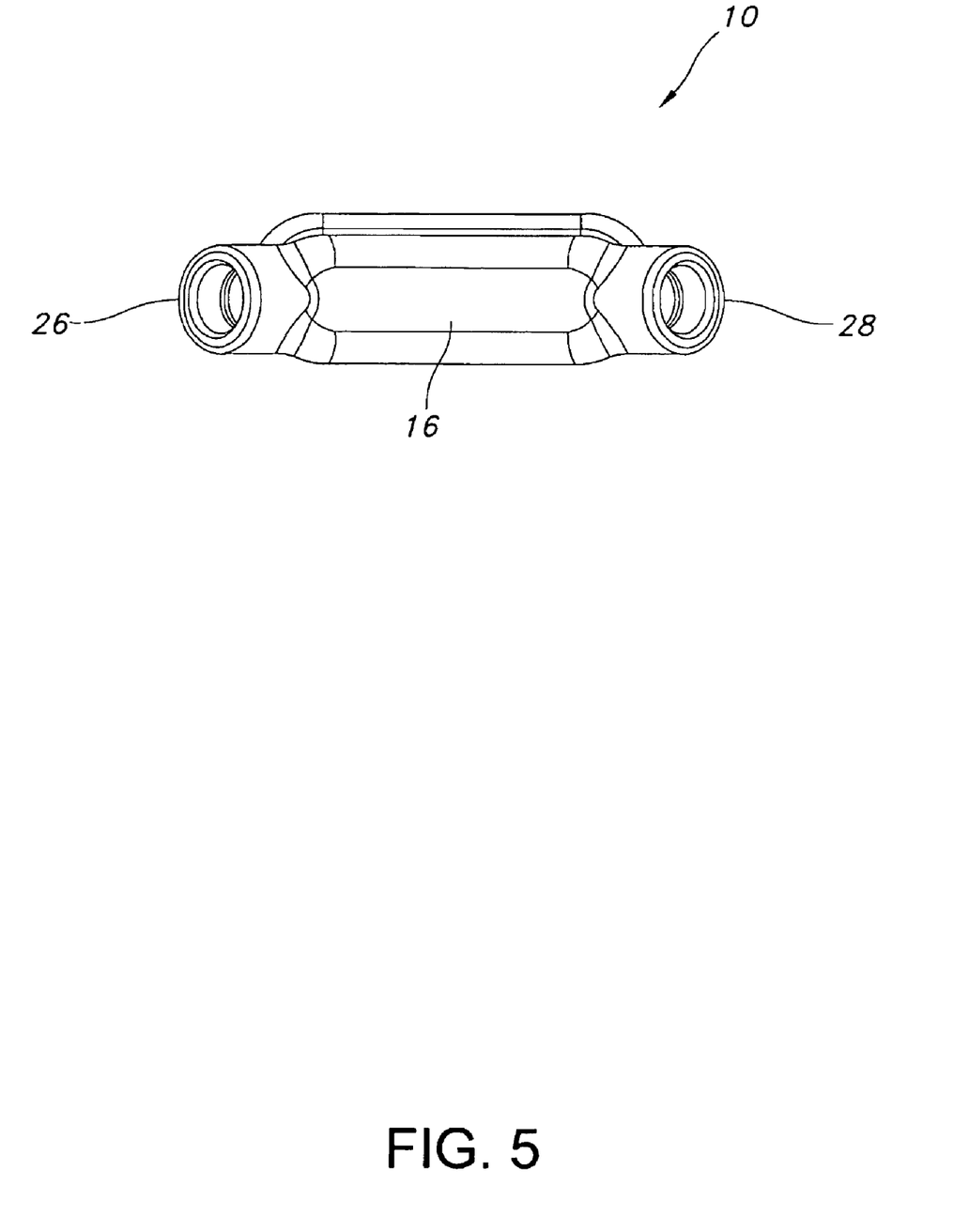
FIG. 5 is bottom view perspective showing of the conduit body of the present invention.
Figure 6:
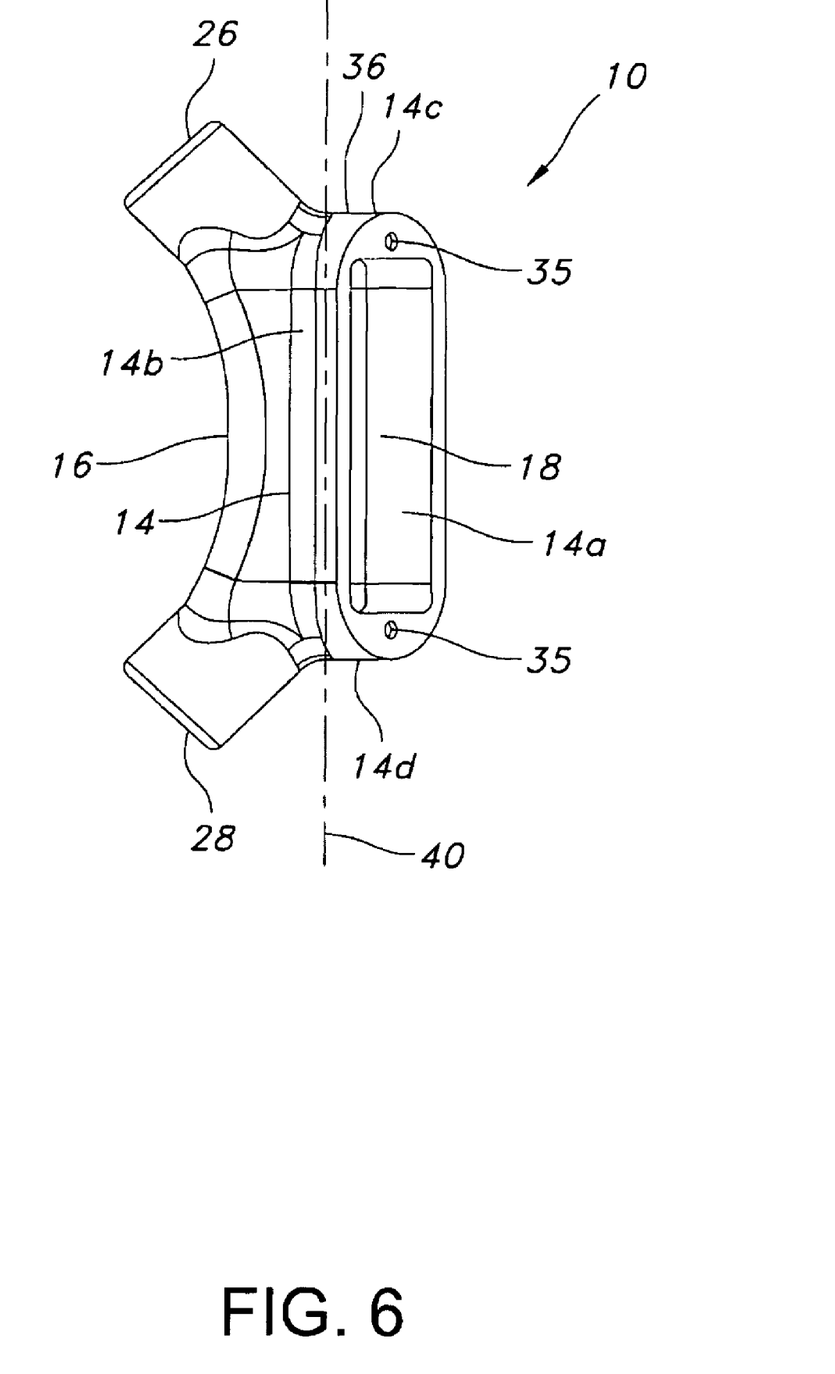
FIG. 6 shows the conduit body of the present invention in the LR orientation.
Figure 7:
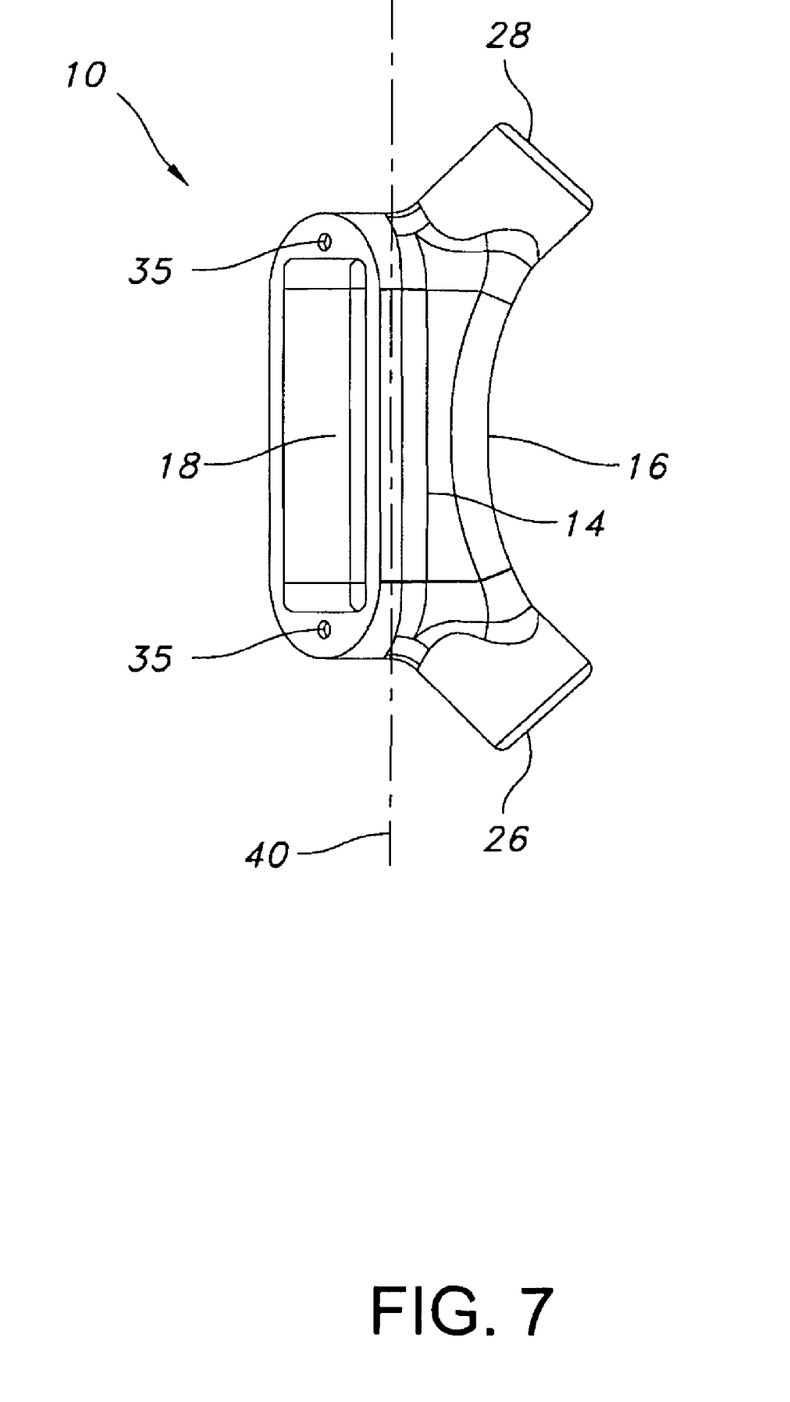
FIG. 7 shows the conduit body of the present invention in the LL orientation.
Figure 8:
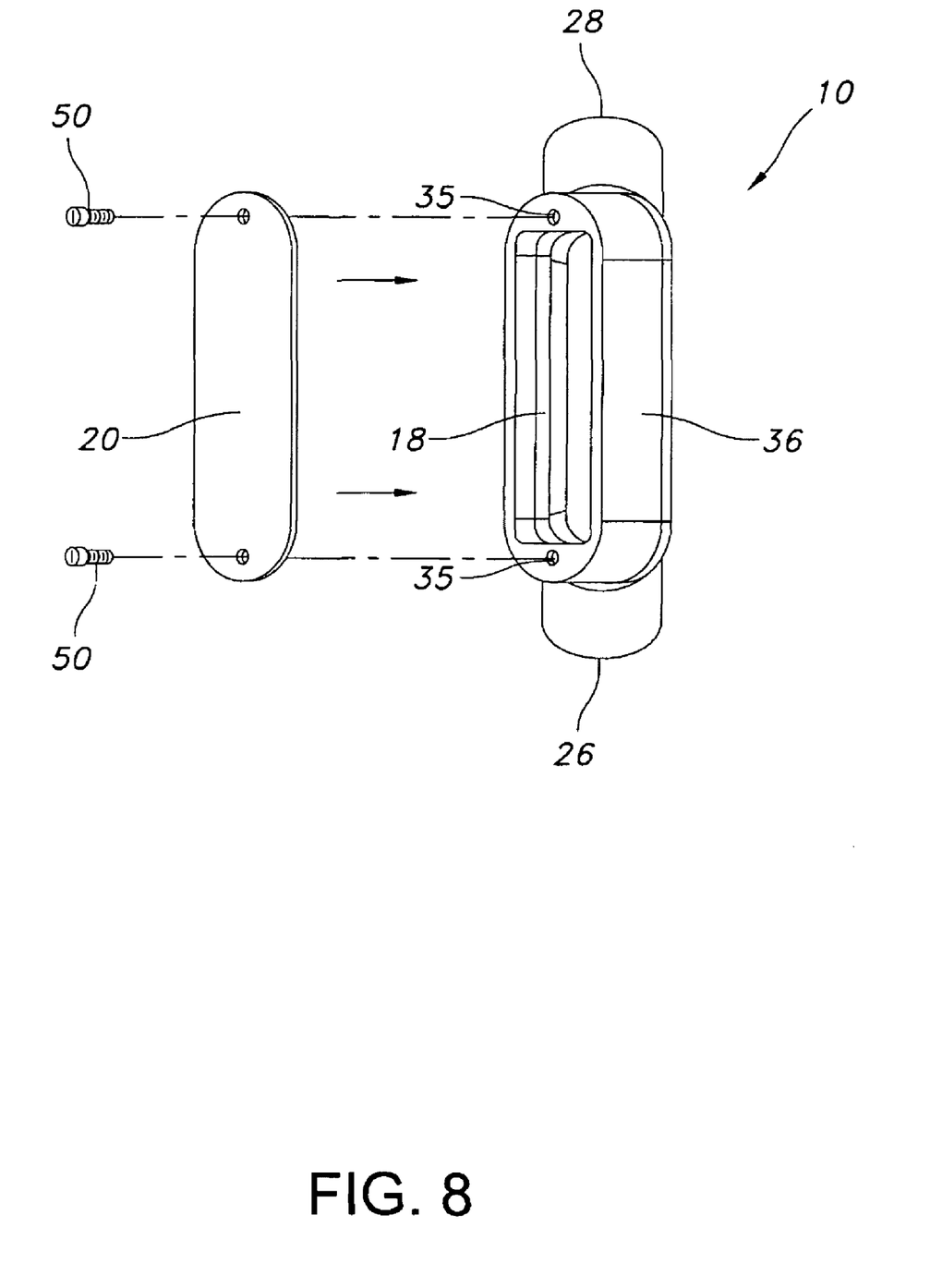
FIG. 8 shows the conduit body of the present invention in the LB orientation.

FIG. 5 shows a bottom view of the conduit body 10, showing the angles of the hub passageways 26 and 28, which are in communication with the chamber 22. Preferably, the hub passageways 26 and 28 are located at the longitudinal ends of the curved bottom end 18. By using a conduit device using angled hub passageways 26 and 28, as well as an angled open end 18, the present invention may be incorporated into any angles and configurations desired, including traditional configurations such as LR, LL, and LB, among others. As can be seen in FIG. 6, the device may be used in an LR configuration. FIG. 7 shows the device as used in an LL configuration, and FIG. 8 shows the device as used in an LB configuration. Other configurations may be used if desired.

As seen in FIG. 8, the device may include an optional removable cover 20, which is configured to be attached to the conduit body 10 over the open end 18. In one embodiment, the cover is attached via two screws 50, which are adapted to be inserted through apertures in the cover 20 and the conduit 10. Other fasteners and fastening means may be used if desired.

Figure 9:
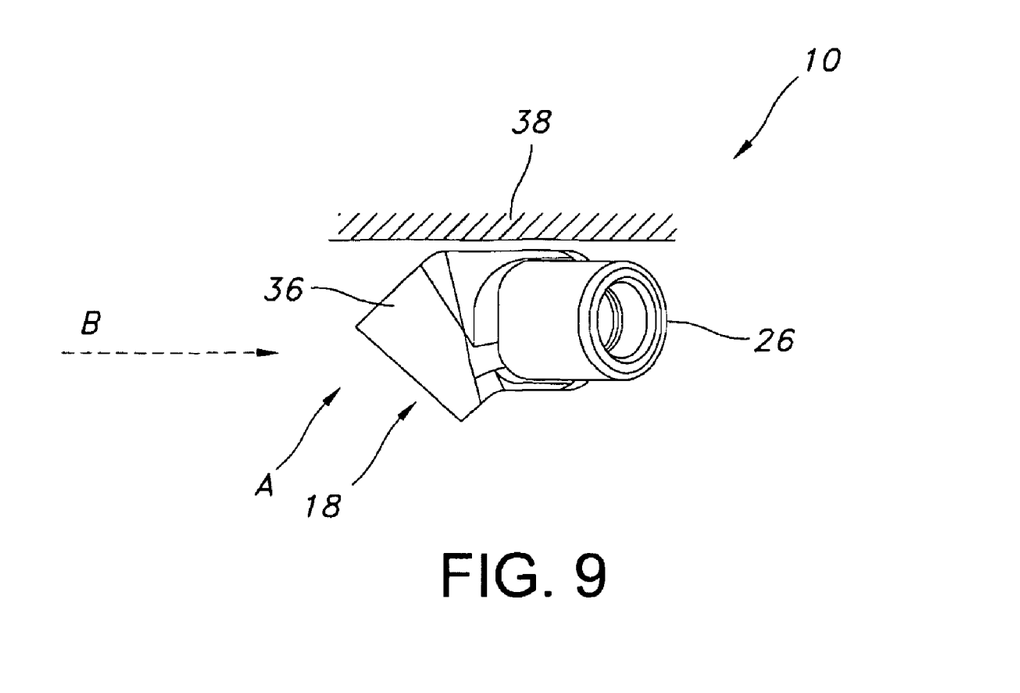
FIG. 9 shows the conduit body of the present invention as mounted to a ceiling in the LL orientation.
Figure 10:
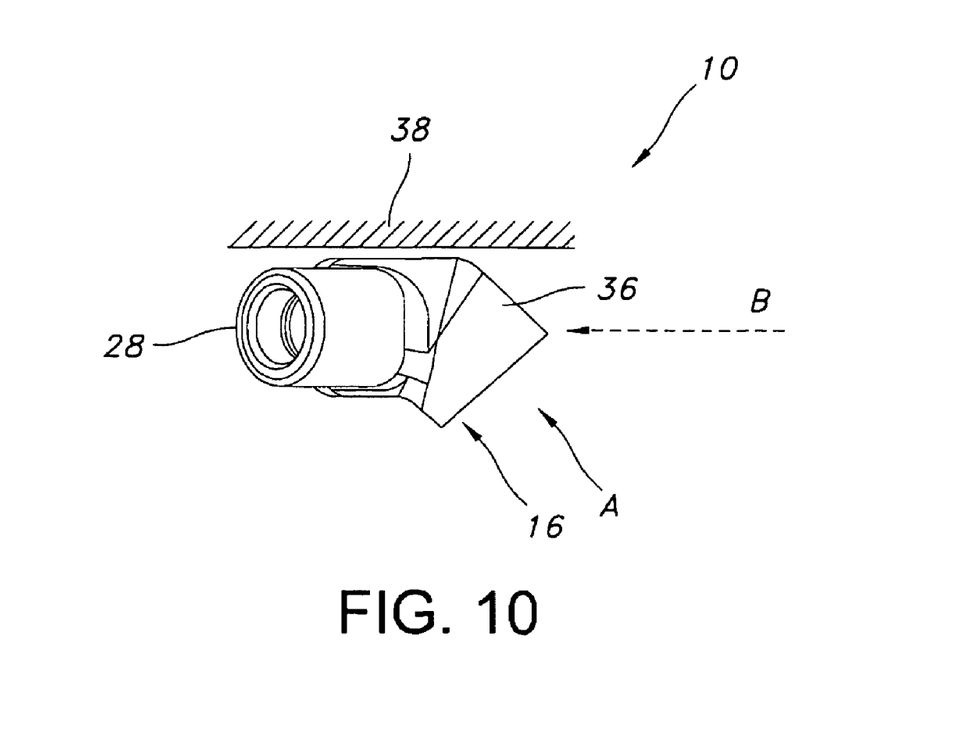
FIG. 10 shows the conduit body of the present invention as mounted to a ceiling in the LR orientation.

The conduit device of the present invention is designed to facilitate the placement and feeding of wires and cables in any location desired. The conduit body 10 may be supported by the hubs to which it is attached, or optionally the device may be mounted to the side of a wall or other location. One of the perimetrical side walls of the device may serve as a mounting wall for mounting the device to the side of a wall, if desired. The device may be placed at any locations, including to the sides of a wall, to the ceiling, or optionally to the bottom floor, depending on the wiring scheme used. As seen in FIGS. 9 and 10, the conduit body 10 may be located on a ceiling 38 in any configuration, including in an LL configuration (FIG. 9) or an LB configuration (FIG. 10). Other configurations are possible and contemplated, including, for example, C, T, and X configurations, which may incorporate more than two hub passageways located at various positions and angles.

The angled open end 18 of the conduit 10 facilitates feeding of wires and cables 24 through the chamber 22. As can be seen in FIGS. 9 and 10, when the conduit 10 of the present invention is located against the side of a structural wall 38, the open end 18 is angled away from the structural wall 38. Angling the open end 18 away from the structural wall 38 allows for an easier access by the user to the interior chamber 22, facilitating the feeding and pulling of wires 24 through the hub passageways 26 and 28. The angle of the open end 18 may be any angle desired, ranging from about 1° to about 89° from the structural wall 38. Further, the open end 18 may be raised from the chamber 22 of the conduit 10, allowing for a more pronounced angle. The open end may be raised to any degree, to allow for an easier access to the inside chamber 22 by the user. The angle of the open end 18 allows wire insertion and management in a direction intersecting the structural wall 38 (Arrow A). In the prior art device, the open access is only provided in a direction parallel to the structural wall 38 (Arrow B).

Figure 11:
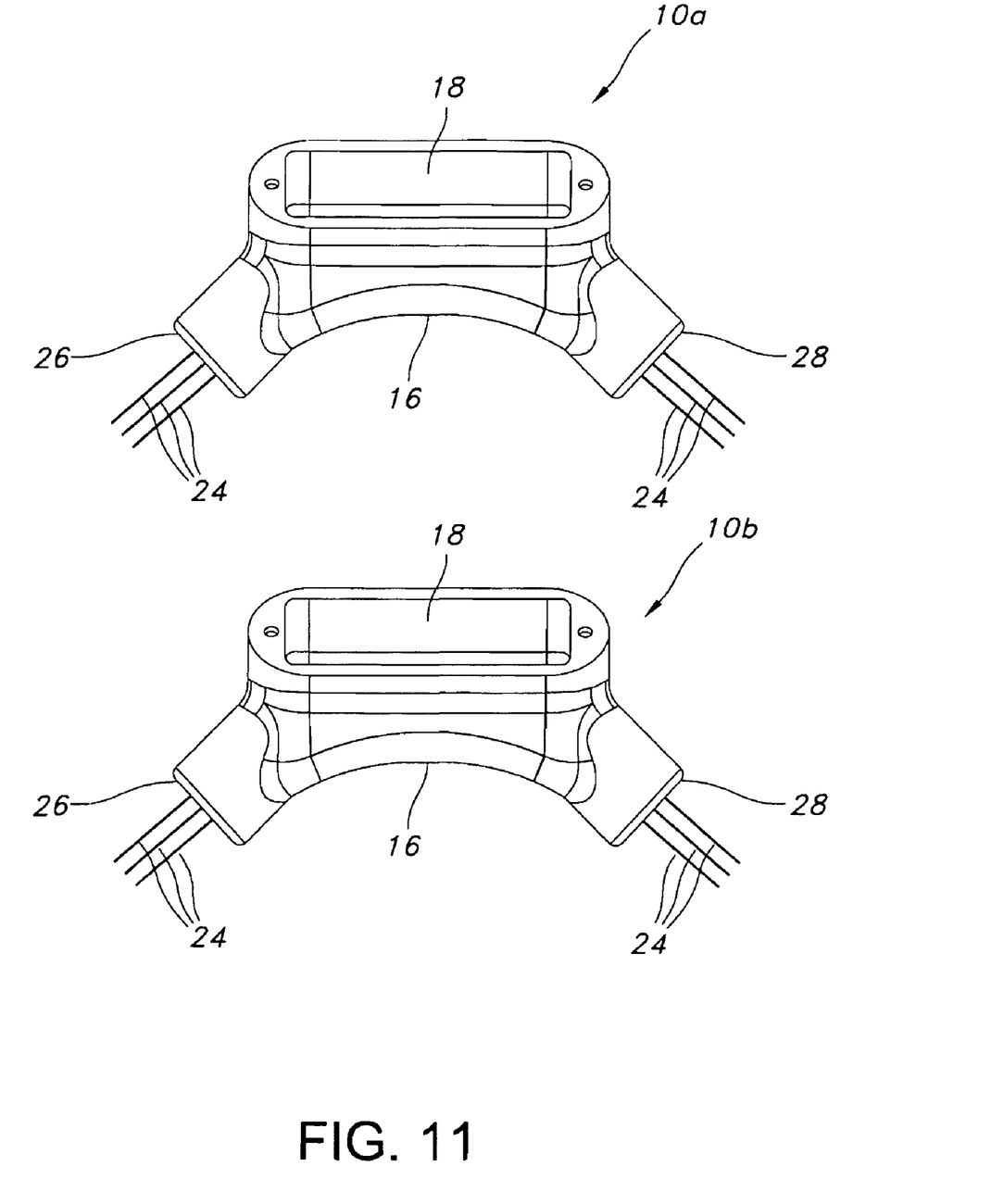
FIG. 11 shows the stacking ability of the conduit body of the present invention.

As can be seen in FIG. 11, the present invention may be used in a "stacked" fashion, where one conduit body 10a is located directly above another conduit body 10b. The angled hub passageways 26 and 28 allow for wires and cables 24 to be fed through each of conduit bodies 10a and 10b, without either interfering with the wires and cables 24. In traditional conduits, where at least one hub passageway is located at a 90° angle to the axis of the chamber, a conduit located directly below interferes with the feeding of wires and cables. Thus, the user would be faced with the choice of either using only one conduit body or horizontally spacing the conduit bodies apart from each other enough so that there is no interference. Due to space constraints, however, this horizontal spacing may not be a viable option for the user. Because the hub passageways 26 and 28 are angled with respect to the longitudinal axis 40 of the chamber 22, a second conduit body 10b located directly below conduit body 10a will not interfere with the wires and cables 24. This allows for more wires and cables 24 to be fed through the conduit bodies 10a and 10b simultaneously while eliminating the need to space the conduits 10a and 10b horizontally from each other.

What is claimed is:

1. A conduit body device for accommodating wire therethrough said device comprising:
   a. a conduit body having elongate perimetrical side walls, end walls, a bottom wall, and an open end defining a body interior, said conduit body having a longitudinal axis located generally along said elongate side walls; and
   b. at least two hub passageways extending from said conduit body in communication with said body interior, each of said hub passageways including a hub wall defining an access channel for passage of said wire therethrough;
   wherein said at least two hub passageways are in a non-axial, non-perpendicular alignment with said longitudinal axis.

2. The device of claim 1 comprising two hub passageways.

3. The device of claim 2 wherein said hub passageways are located at a substantially perpendicular orientation to each other.

4. The device of claim 1 wherein said open end is positioned at a location approximately opposite said hub passageways.

5. The device of claim 1 further including a removable cover positioned over said open end.

6. The device of claim 5 wherein said open end is located at a non-perpendicular angle to said elongate side wall.

7. The device of claim 1 wherein said bottom wall includes a curved shape.

8. The device of claim 7 wherein said curved shape extends entirely along the bottom wall.

9. The device of claim 8 wherein said hub passageways are located adjacent the longitudinal ends of said bottom wall.

10. A conduit body device for accommodating wire therethrough said device comprising:

a. a conduit body having elongate perimetrical side walls, end walls, a bottom wall, and an angled open end, said body including a body interior; and b. at least two hub passageways extending from said conduit body in communication with said body interior, each of said hub passageways including a hub wall defining an access channel for passage of said wire therethrough;

wherein said open end is positioned at a non-perpendicular angle with respect to said elongate perimetrical side walls.

11. The conduit body of claim 10, wherein said at least two hub passageways are located at approximately the longitudinal ends of said bottom wall.

12. The conduit body of claim 10, wherein said open end is raised to a location away from said body interior.

13. The conduit body of claim 10, wherein said conduit body has a longitudinal axis located generally along said elongate side walls and wherein said at least two hub passageways are in a non-axial configuration with said longitudinal axis.

14. The conduit body of claim 10, wherein one of said side walls defines a mounting wall for supporting said conduit body to a structural wall.

15. The conduit body of claim 14, wherein said open end extends at non-perpendicular angular orientation with respect to said mounting wall so as to provide access to said open end when said conduit body is mounted on said structural wall.

* * * * *